G. K. SNOW.
Affixing Post Office Stamps.
No. 2,737. Reissued Aug. 20, 1867.
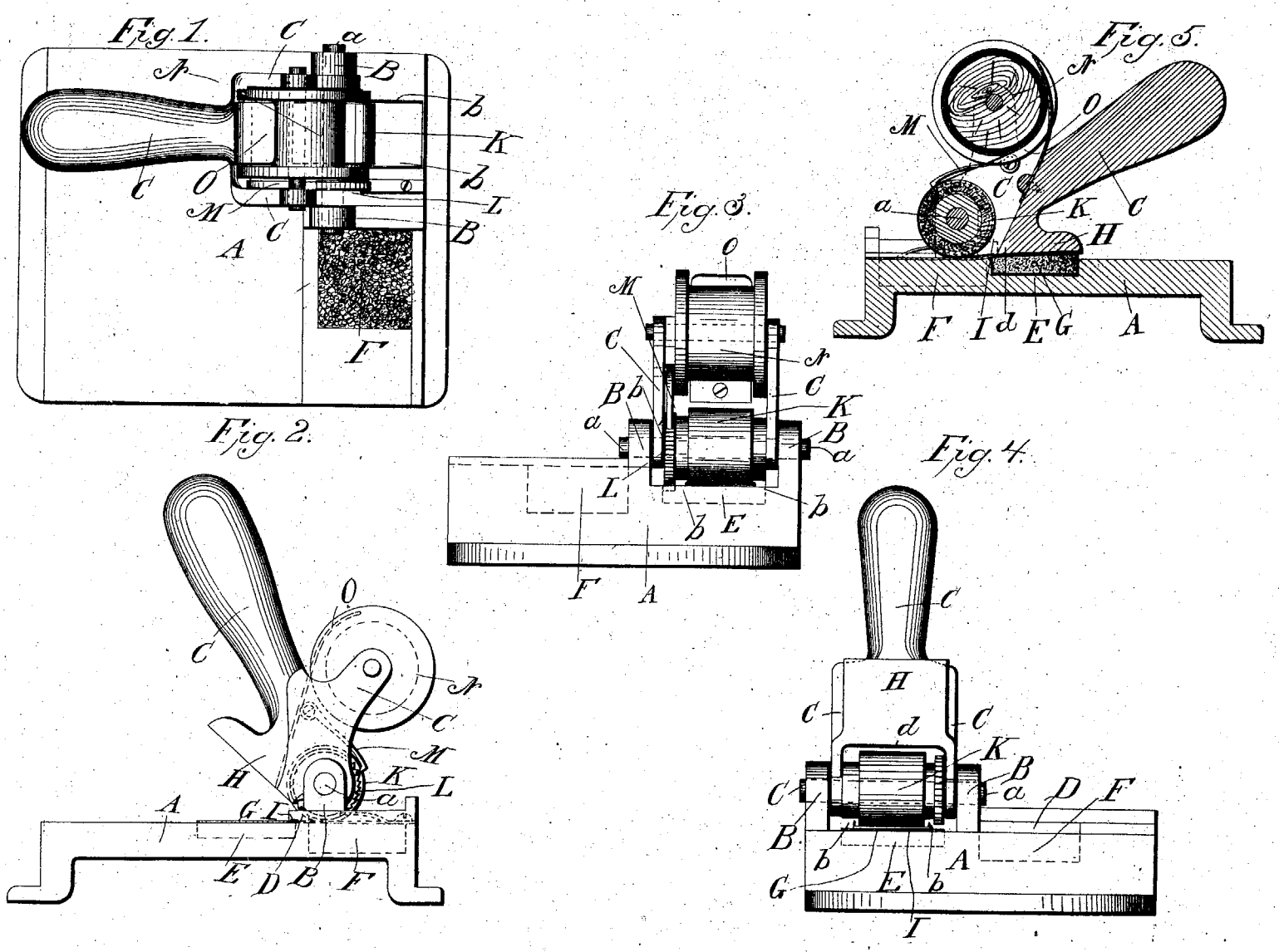

BEST AVAILABLE COPY

United States Patent Office.

R. HOE AND COMPANY, OF NEW YORK, N. Y., ASSIGNEES BY MESNE ASSIGNMENTS OF GEORGE K. SNOW.

*Letters Patent No.* 20,306, *dated May* 18, 1858; *reissue No.* 2,737, *dated August* 20, 1867.

MACHINE FOR AFFIXING POST OFFICE STAMPS TO LETTERS.

The Schedule referred to in these Letters Patent and making part of the same.

TO ALL WHOM IT MAY CONCERN:

Be it known that GEORGE K. SNOW, of Watertown, in the county of Middlesex, and State of Massachusetts, invented a new and useful Machine for Affixing Postage Stamps and Address Labels to Letters, Newspapers, and other mailable matter for transmission in the mails; and we do hereby declare the following to be a full, clear, and exact description thereof, reference being had to the accompanying drawings, figures, and letters of reference thereon, making part of this specification. Of the said drawings—

Figure 1 is a top view.

Figure 2 is a side elevation.

Figure 3 is a rear elevation.

Figure 4 is a front elevation.

Figure 5 is a vertical section of the same.

Similar letters of reference indicate like parts in all the drawings.

The machine as exhibited in the drawings is very efficient in operation, and calculated for use in post offices, merchants' counting-rooms, newspaper offices, and elsewhere, where it is desirable to affix postage stamps or address labels which are coated with adhesive material.

A is a frame or table, constructed with two standards, B B, for supporting the fulcrum-shaft *a* of a hand lever, C. It is also made with a rising or ledge, D, and two depressions or sunken places, E F. The space E is to contain an elastic bed or cushion, G, made of vulcanized India rubber or other suitable material, while the space F is to hold a sponge or other absorbent substance to contain a liquid. These spaces, as well as the gauge or ledge D, are to be arranged with reference to the standards B B, as shown in the drawings. The said lever C carries a platen, H, whose inner edge operates or is provided with a shear or cutting edge, *d*, or a means of causing another shear or cutter, I, arranged at the rear part of the elastic bed, to separate a postage stamp or label from a strip of such when placed between the bed and platen, and the latter is forced down upon the former and the article laid thereon to receive the stamp or label. On the shaft *a*, and so as to freely rotate thereon, is a feeding-roller, K, furnished with a covering, which is to feed the stamp or label, such roller being placed directly over the table, and provided with a ratchet, L. A spring-pawl, M, extends from the lever C and works in the teeth of the ratchet. The lever C may also carry a small drum or roller, N, which, when the machine is in use, may have a strip of postage stamps or address labels wound around it. A spring, O, projecting from the lever, and bearing on the outer periphery of the wound strip, serves to keep the drum from being revolved too fast while the machine is being used.

In order to prepare the machine for operation the strip of stamps or labels should be led from the drum N downwards against the rear edge of the feed-roller, and between such feed-roller and the table, as well as between the parallel guides or ledges *b b*, arranged on and projecting above the table, as shown in figs. 1 and 3. By raising the lever C the feed-roller will be turned and made to cause the strip to advance over the shear or cutter I, and upon the bed or cushion G. After the strip has been so moved far enough to bring the cutter directly between the postage stamp or label at the end of the strip and the second one, the machine will be ready for fixing the first stamp or label. The arrangement of the strip on the drum should be such as to cause its pasted or sized side to be uppermost when a postage stamp or label is lying upon the elastic bed. Such being the condition of things, the operator should take hold of the lever with the left hand, while the article to be stamped or labelled should be held in the right hand, with its face downward; next, he should lay and press on the dampening material, in the recess F, that part of the surface of the article which is to receive the stamp or label. This having been done, the next thing is to lay the wet surface on the postage stamp or label lying on the bed, taking care to bring the edge of the article close to or against the ledge or gauge D; next, with the left hand he should bear the lever downwards, so as to press the article to be stamped or labelled upon the stamp or label, and cause the stamp or label to be severed from the strip and made to adhere to the article. The next time the lever is elevated another stamp or label will be advanced towards and upon the bed for repeating the operation.

We claim as the invention of GEORGE K. SNOW—

1. The combination of the following elements, namely, a feeding mechanism to advance the strip of stamps or labels, a shearing or cutting mechanism to separate the stamps or labels, a platen to affix the stamps or labels, and a bed, or equivalent therefor, to support the article being stamped or labelled, constructed and operating substantially as described and for the purposes specified.

2. The feeding mechanism, the platen, the shear or shears, arranged with respect to the lever, and the bed, or equivalent therefor, substantially as specified, whereby, by the reciprocating motions of the lever, results will take place substantially as set forth.

3. The combination and arrangement, in a single instrument, of the lever C, the platen H, and a shear or cutting edge, *d*, substantially as described and for the purposes set forth.

R. HOE & CO.

Witnesses:
JOHN WEBB,
ROBERT COCHRAN.